May 3, 1949.  
C. W. BERTHIEZ  
2,469,029  
PROTECTING DEVICE FOR THE COMMUTATOR AND BRUSHES OF DYNAMO MACHINES  
Filed June 28, 1946
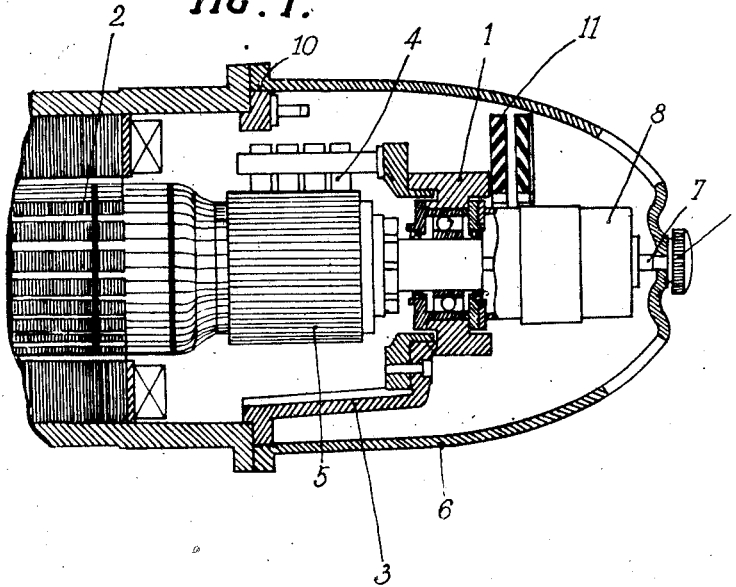
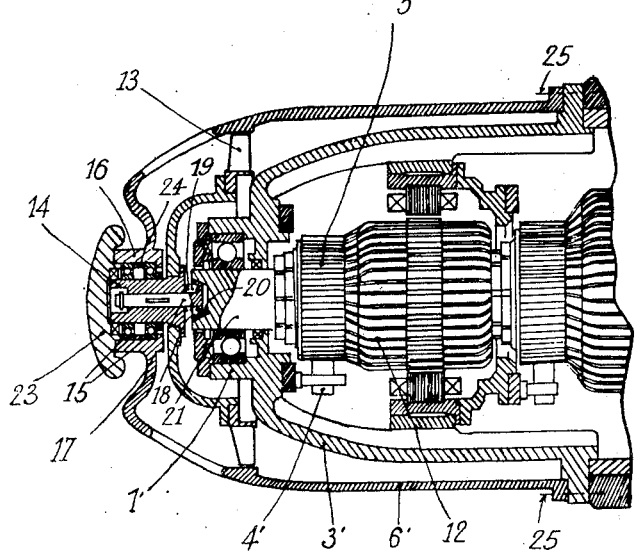
Charles William Berthiez  
INVENTOR  
By George H. Covey  
His Attorney Patented May 3, 1949

2,469,029

UNITED STATES PATENT OFFICE 2,469,029

PROTECTING DEVICE FOR THE COMMUTATOR AND BRUSHES OF DYNAMO MACHINES

Charles William Berthiez, Paris, France

Application June 28, 1946, Serial No. 679,944
In France October 4, 1945

8 Claims. (Cl. 171—252)

In the closed commutator dynamo-machines now in use, the commutators and brush carriers are protected by the closed casing of the machine while inspection doors are provided in said casing for allowing the adjustment, the grinding and the replacement of the brushes. But in such machines the possibility of reaching the brushes remains always very restricted and inconvenient, chiefly if it is desired, for instance, to grind the commutators with sand paper.

In contrast, in the case of open machines the bearings are carried by arms providing an easy access to the commutator and to the brushes but said commutator and brushes are no longer protected.

My invention has for its object a protective arrangement for the commutator and the brushes of dynamo machines whereby it is possible to avoid the two above disclosed series of drawbacks.

My invention is chiefly characterized through the fact that the bearing of dynamo machines on the commutator side is supported as in the case of open motors by arms providing an easy access to the brushes and to the commutator while this end of the machine also is closed by a removable hood.

Preferably the removable hood is secured to the machine by means of a quick fastening system.

In the case where the machine is provided with terminal carrying plates, the latter are preferably transferred towards the commutator end of the machine and are arranged underneath the removable hood at the outer side of the corresponding bearing supporting arms so that they may be uncovered at the same time as the brushes when the hood is removed.

In the same case, the terminal carrying plates may be of circular or semi-circular shape so as to match the inside of the hood, which allows a saving of space.

When the ventilation of the machine is effected endwise, the fan is secured to a shaft rotatably carried in a bearing supported by the hood and adapted to be mechanically coupled with the shaft of the machine when the hood is in place.

Other characteristic features and advantages of my invention will appear in the following description referring to accompanying drawing showing, diagrammatically and by way of example only, two forms of execution of my invention.

In said drawing:

Fig. 1 is a longitudinal cross-section of one end of the electric D. C. motor improved in accordance with my invention.

Fig. 2 is a similar view of a Ward-Leonard group to which the present invention is adapted.

As apparent in Fig. 1, which shows only one end of the motor modified in accordance with my invention, the bearing 1 of the electric D. C. motor 2 is carried at the commutator end thereof by arms 3 which allow a free access to the brushes 4 and to the commutator 5, while the spacing between said arms is sufficient to provide for a very easy access to said parts, which allows a ready adjustment and replacement of the brushes and an easy execution of the grinding of the brushes and commutator with sandpaper, as in the case of the open motors now in use.

But in accordance with my invention, the motor has the additional advantage of closed motors by reason of the commutator and brushes being protected by a removable hood 6 which is provided with means for easy dismantling, such for instance as a threaded rod 7 the tail end of which is held inside a stationary member, such as the dynamo tachymeter 8. The rod 7 is fitted through the end of the hood 6 and is provided at its outer free end with a knurled nut 9 bearing against the outer surface of the hood 6 and urging the latter against the body of the machine 2, which is preferably provided at this end with a centering surface 10. The removal of the hood may be obtained through mere unscrewing of the knurled nut 9.

As also apparent in the drawing, in the case illustrated in Fig. 1, the terminal plates 11 are removed towards the right hand side so that they may be readily accessible when the hood has been removed. Thus a single dismantling, to wit that of the hood 6, provides an easy access to the brushes and to the commutator as well as to the terminals.

Moreover these terminal plates 11 are of circular shape or, as illustrated in the drawing, of semi-circular shape so that they may be fitted inside the shape of the hood which is preferably that of a solid of revolution round the axis of the motor. This shape given to the plate 11 allows saving room, which reduces the size of the motor.

In Fig. 2, I have shown the application of my invention to a group of the Ward-Leonard type used as a device for varying the speed, for the control of a part of a machine such as a machine tool. In said Fig. 2, I have shown only one side of the group, a similar arrangement being used if required at the other end thereof.

As apparent, I use in this group in a manner similar to that used in the preceding form of execution on one hand a support 1' constituted by arms 3' for the bearing of the shaft of the electric D. C. machine 12 e. g. the exciter of a Leonard group and on the other hand a protective hood 6' with a view to allowing an easy access to the brushes 4' and to the commutator 5' once the protective hood has been removed and protecting said parts when the hood is in place.

In the form of execution illustrated in Fig. 2, it should be noticed moreover, according to a further feature of my invention which appears when the ventilation is effected through the end or ends of the machine, that the fan 13 is secured to a shaft 14 rotatably carried through the agency of a ball bearing 15 inside a bearing housing 16 rigid with the hood 6'. A member 17 is slidingly keyed to the shaft 14 and is provided at one end with a clutch cone 18 adapted to cooperate under the action of a compression spring 19 with the complementary cone 20 on the machine shaft 21. A plug 23 secured to the bearing housing 16 through screws not illustrated holds the ball bearings 15 in place, said bearings being separated by a stay ring 24.

Lastly the hood 6' carrying the whole ventilation system is secured to the machine through a plurality of screws shown diagrammatically in the drawing through their axes 25.

The operation of the arrangement is self-explanatory:

When the hood is in place the commutator and brush system are well protected, as clearly shown in the drawing, while the fan is driven into rotation by the shaft of the machine through the agency of the cone clutch 18—20. If the screws 25 are unscrewed, it is then easy to remove the hood carrying the fan and the access to the brushes and to the commutators is then very easy.

When the hood is mounted again, the clutch 18—20 returns automatically into engagement under the action of the spring 19.

Of course, many modifications may be brought to the arrangements described and illustrated by way of example, more particularly in order to take into account the type of machine to which the invention is to be applied, without the general arrangement of the invention being modified thereby. Thus in particular the means for securing the hood may be chosen of another type than that disclosed.

What I claim is:

1. In a dynamo electric machine having a frame and a rotor, the combination with a bearing bracket supported by said frame of said machine, and a bearing for said rotor supported by said bearing bracket outwardly with respect to said frame along the axis of rotation toward an end of said rotor, said bracket being constructed to provide easy access to said rotor at either side thereof transversely of the axial direction, of a hood formed to be removably supported in position to cooperate with said frame to enclose a space about said bracket and said bearing and said end of said rotor, and means providing a disconnectible connection between the portion of said hood which extends about said end of said rotor adjacent said axis thereof and a part of said dynamo electric machine adjacent said axis for transmitting stress between said hood and said part, said connection being effected at a single point to provide for removal of said hood and the parts supported thereby as a whole.

2. In a dynamo electric machine having a frame and a rotor, the combination with a bearing bracket supported by said frame of said machine, and a bearing for said rotor supported by said bearing bracket outwardly with respect to said frame along the axis of rotation toward an end of said rotor, said bracket being constructed to provide easy access to said rotor at either side thereof transversely of the axial direction, of a hood formed to be removably supported in position to cooperate with said frame to enclose a space about said bracket and said bearing and said end of said rotor, and means for releasably fastening said hood in said position and engaging the portion of said hood which extends about said end of said rotor adjacent the axis of said rotor and being connected to said bracket to provide for easy removal of said hood from and placement thereof in said space enclosing position.

3. In a dynamo electric machine having a frame and a rotor, the combination with a bearing bracket supported by said frame of said machine, and a bearing for said rotor supported by said bearing bracket outwardly with respect to said frame along the axis of rotation toward an end of said rotor, said bracket being constructed to provide easy access to said rotor at either side thereof transversely of the axial direction, of a hood formed to be removably supported in position to cooperate with said frame to enclose a space about said bracket and said bearing and said end of said rotor, a rotatable member supported by said hood for rotation thereof on an axis coincident with the axis of said rotor when said hood is in said space enclosing position and so as to be removed with said hood, and clutch means carried by said rotatable member and removable therewith and cooperating with said rotor when said hood is in said position to establish a driving connection between said rotor and said rotatable member.

4. In a dynamo electric machine having a frame and a rotor, the combination with a bearing bracket supported by said frame of said machine and providing a plurality of arms extending from said frame outwardly with respect thereto in the direction along the axis of rotation of said rotor toward an end thereof, and a bearing for said rotor supported by said arms adjacent the outer extremities thereof, said arms being in spaced relation about the axis of said rotor to provide easy access to said rotor, of a hood formed removably to engage said frame of said machine and to cooperate therewith to enclose a space about said arms and said bearing and said end of said rotor supported thereby, and means for releasably fastening said hood in said frame engaging position, said means engaging the portion of said hood which extends about said end of said rotor adjacent the axis of said rotor and being connected to said bracket to hold said hood in said frame engaging space enclosing position so as to provide for removal of said hood upon release of said fastening means.

5. In a dynamo electric machine having a frame and a rotor, the combination with said frame of said machine, and means supporting said rotor for rotation relative to said frame, said rotor extending beyond said frame in the direction parallel to the axis of said rotation, of a hood formed to be removably supported in position to cooperate with said frame to enclose a space about said extension of said rotor, a rotatable member supported by said hood for rotation thereof on an axis coincident with the axis of said rotor when said hood is in said space enclosing position and so as to be removed with said hood, and clutch means carried by said rotatable member and cooperating with said rotatable member and adapted to engage said rotor when said hood is in said position to establish a driving connection between said rotor and said rotatable member.

6. In a dynamo electric machine, the combination as defined in claim 5 which comprises a rotatable fan element carried by said rotatable member for rotation on the axis thereof and adapted to be driven by said rotor to provide ventilating air for said dynamo electric machine when said hood is in said space enclosing position.

7. In a dynamo electric machine having a frame and a rotor, the combination with a bearing bracket supported by said frame of said machine, and a bearing for said rotor supported by said bearing bracket outwardly with respect to said frame along the axis of rotation toward an end of said rotor, said bracket being constructed to provide easy access to said rotor at either side thereof transversely of the axial direction, of a hood formed to be removably supported in position to cooperate with said frame to enclose a space about said bracket and said bearing and said end of said rotor, and removable fastening means engaging said hood only in the portion thereof which is adjacent the axis of said rotor and extends about said end of said rotor, said fastening means being connected to the outer extremity of said bracket to provide for removal from and replacement of said hood in said space enclosing position upon operation of said fastening means.

8. In a dynamo electric machine having a frame and a rotor, the combination as defined in claim 7, said frame being provided with a surface generally parallel to and extending about the axis of said rotor, said hood in said space enclosing position engaging said surface formed on said frame for centering said hood in relation to the axis of said rotor.

CHARLES WILLIAM BERTHIEZ.

REFERENCES CITED

The following references are of record in the file of this patent:

UNITED STATES PATENTS

| Number | Name | Date |
| --- | --- | --- |
| 669,577 | Eck | Mar. 12, 1901 |
| 726,795 | Cornu | Apr. 28, 1903 |
| 1,441,460 | Sutcliffe | Jan. 9 1823 |
| 2,373,981 | Spengler | Apr. 17, 1945 |